United States Patent
Hasselberg et al.

(10) Patent No.: US 8,925,200 B2
(45) Date of Patent: Jan. 6, 2015

(54) METHOD FOR REPAIRING AN AIRFOIL

(75) Inventors: Timothy P. Hasselberg, Middletown, CT (US); James J. Moor, New Harford, CT (US); David A. Gaudreau, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 1949 days.

(21) Appl. No.: 12/057,323

(22) Filed: Mar. 27, 2008

(65) Prior Publication Data

US 2009/0241339 A1 Oct. 1, 2009

(51) Int. Cl.
| | |
|---|---|
| *B23P 6/00* | (2006.01) |
| *B23K 9/04* | (2006.01) |
| *B23K 9/32* | (2006.01) |
| *B23K 37/04* | (2006.01) |
| *B23K 37/06* | (2006.01) |
| *F01D 5/00* | (2006.01) |

(52) U.S. Cl.
CPC .................. *B23P 6/007* (2013.01); *B23K 9/046* (2013.01); *B23K 9/32* (2013.01); *B23K 37/0435* (2013.01); *B23K 37/06* (2013.01); *F01D 5/005* (2013.01); *B23K 2201/001* (2013.01); *F05D 2230/30* (2013.01); *F05D 2230/80* (2013.01); *F05D 2230/232* (2013.01)
USPC ... 29/889.1; 29/889.7; 29/525.14; 29/889.21; 29/592; 29/889; 29/402.01; 29/402.07

(58) Field of Classification Search
USPC ........... 29/889.7, 525.14, 889.1, 889.21, 592, 29/889, 402.01, 402.07
See application file for complete search history.

(56) References Cited

U.S. PATENT DOCUMENTS

| | | | |
|---|---|---|---|
| 4,309,848 A | 1/1982 | Arrigoni | |
| 4,726,104 A | 2/1988 | Foster et al. | |
| 4,841,117 A * | 6/1989 | Koromzay | 219/76.1 |
| 5,160,822 A * | 11/1992 | Aleshin | 219/121.64 |
| 5,553,370 A * | 9/1996 | Pepe | 29/889.1 |
| 5,644,394 A | 7/1997 | Owens | |
| 5,794,338 A | 8/1998 | Bowden, Jr. et al. | |
| 5,822,852 A | 10/1998 | Bewlay et al. | |

(Continued)

FOREIGN PATENT DOCUMENTS

| | | | | |
|---|---|---|---|---|
| JP | 10080767 | | 3/1998 | |
| JP | 10080767 A | * | 3/1998 | ............... B23K 9/04 |
| WO | 2008138300 | | 11/2008 | |

OTHER PUBLICATIONS

Courtot B: "Repair Welding of High Temperature Nickel Super Alloy Castings," Thesis. School of Applied Sciences, Sep. 1, 2007.

(Continued)

*Primary Examiner* — Peter DungBa Vo
*Assistant Examiner* — Azm Parvez
(74) *Attorney, Agent, or Firm* — Carlson, Gaskey & Olds., P.C.

(57) ABSTRACT

An example method of repairing an airfoil includes the steps of securing additional material to a worn airfoil and limiting movement of the additional material with a guide. The method alters some of the additional material to form a desired airfoil contour. Another example method of forming a portion of an airfoil includes the steps of securing additional material to an airfoil, limiting movement of the additional material with a guide, and altering some of the additional material to form a desired airfoil contour.

15 Claims, 3 Drawing Sheets

(56) References Cited

U.S. PATENT DOCUMENTS

| | | | |
|---|---|---|---|
| 5,913,555 | A | 6/1999 | Richter et al. |
| 6,376,801 | B1 | 4/2002 | Farrell et al. |
| 6,558,119 | B2 | 5/2003 | Lee et al. |
| 6,742,698 | B2 | 6/2004 | Shah et al. |
| 6,908,288 | B2 | 6/2005 | Jackson et al. |
| 6,991,150 | B2 * | 1/2006 | Sato et al. ............... 228/119 |
| 7,449,658 | B2 * | 11/2008 | Mielke ............... 219/121.66 |
| 7,498,543 | B2 * | 3/2009 | Ruokolainen et al. .... 219/137 R |
| 7,836,594 | B2 * | 11/2010 | Rose ............... 29/889.1 |
| 2006/0231535 | A1 * | 10/2006 | Fuesting ............... 219/121.64 |
| 2007/0145028 | A1 | 6/2007 | Artelsmair |
| 2009/0026188 | A1 * | 1/2009 | Schorghuber ............ 219/137 PS |

OTHER PUBLICATIONS

European Search Report, dated Sep. 9, 2009, EP Application No. 09250660.9-1262/2105245.

Courtot, B; Repair Welding of High Temperature Nickel Superalloy Castings; Cranfield University School of Applied Sciences MSc Thesis; Sep. 1, 2007; p. 92.

* cited by examiner

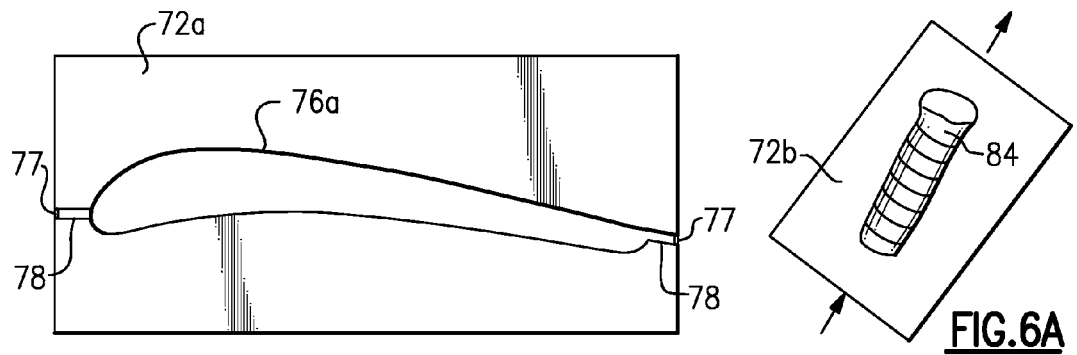
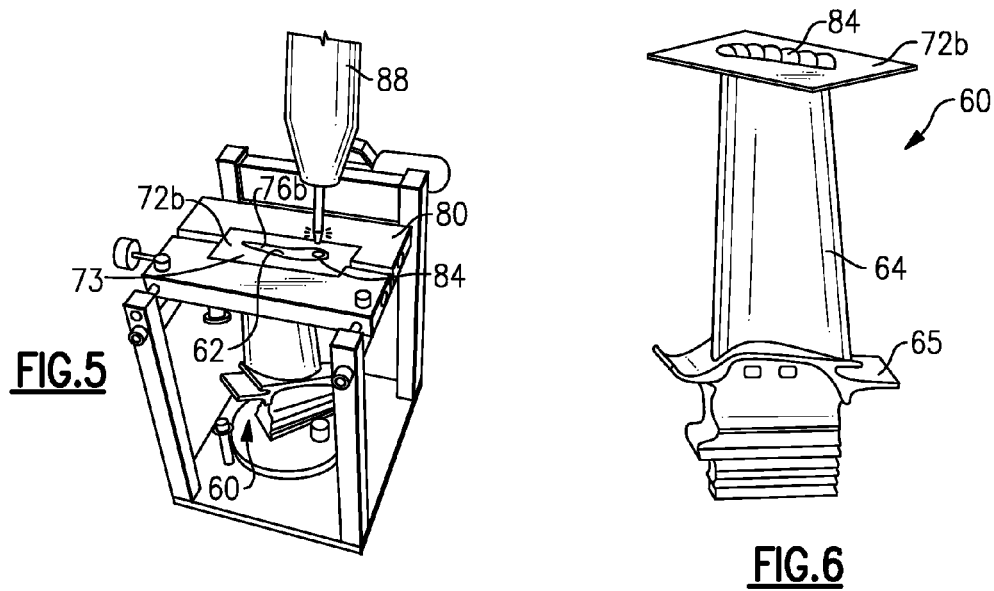
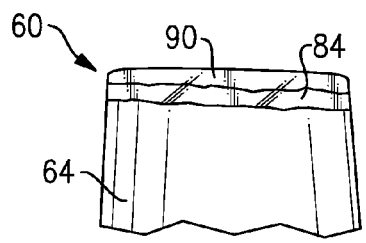

METHOD FOR REPAIRING AN AIRFOIL

BACKGROUND OF THE INVENTION

This application relates to a method of repairing a worn blade airfoil by securing additional material to the blade.

At least some known gas turbine engines include multiple sections, such as a fan, a compression section, a combustor section, a turbine section, and an exhaust nozzle. Blades are mounted within the compressor and turbine sections. The blades have airfoils extending from a platform toward a blade tip.

Rotating blades compress air in the compression section. The compressed air mixes with fuel and is combusted in the combustor section. Products of combustion expand to rotatably drive blades in the turbine section. Some blades rub against other portions of the engine when rotating. The engine dimensions are controlled to prevent too much rubbing, which can fracture the blade or bind the engine. Rubbing wears and stresses the blades, particularly near the blade tip.

Replacing an entire worn blade is expensive due to material and machining costs. Accordingly blades are often repaired instead of replaced. The repairs generally involve removing the worn blade tip and then building up weld filler or similar material on the blade. The material build-up is then machined to an appropriate airfoil shape to form a restored blade tip. Automated weld build-up on the blade can be difficult, especially since the blade has a curved airfoil profile and new material is only desired near the tip end of the blade. Vision systems are sometimes used to control a robotic arm that deposits weld material on the worn area of the blade. Applications using the robotic arm involve complex controls and vision systems, especially if the robotic arm tracks the curved airfoil profile of the blade. Manual weld processes are also used to deposit weld material on the worn area of the blade. Manual weld processes are often more inconsistent than automated processes.

Known cold metal transfer techniques are utilized for welding in various applications. However, cold metal transfer techniques have not been utilized to repair worn blades.

SUMMARY

An example method of repairing an airfoil includes the steps of securing additional material to a worn airfoil and limiting movement of the additional material with a guide.

An example method of repairing a blade for a gas turbine engine includes removing a worn tip area from a blade and utilizing cold metal transfer techniques to deposit additional welding material on the blade to form a different tip area for the blade.

An example intermediately repaired blade includes a blade having an airfoil profile, which includes a repaired section. Additional material is deposited on a worn portion of the blade to fabricate the repaired section using cold metal transfer welding techniques.

An example method of forming a portion of an airfoil includes securing additional material to the airfoil, limiting movement of the additional material with a guide, and altering some of the additional material to form a desired airfoil contour.

BRIEF DESCRIPTION OF THE DRAWINGS

These and other features of the example disclosure can be best understood from the following specification and drawings, the following of which is a brief description:

FIG. 4 shows an example guide for repairing the FIG. 2 blade;

FIG. 5 shows an example fixture for repairing the FIG. 2 blade;

FIG. 6 shows an example of the FIG. 2 blade after material is deposited;

FIG. 6A shows a top view of the FIG. 6 blade; and

FIG. 7 shows a partial view of the FIG. 2 blade after repair.

DETAILED DESCRIPTION OF THE PREFERRED EMBODIMENT

The disclosed examples facilitate depositing additional material on worn blade tips.

Figure 1:
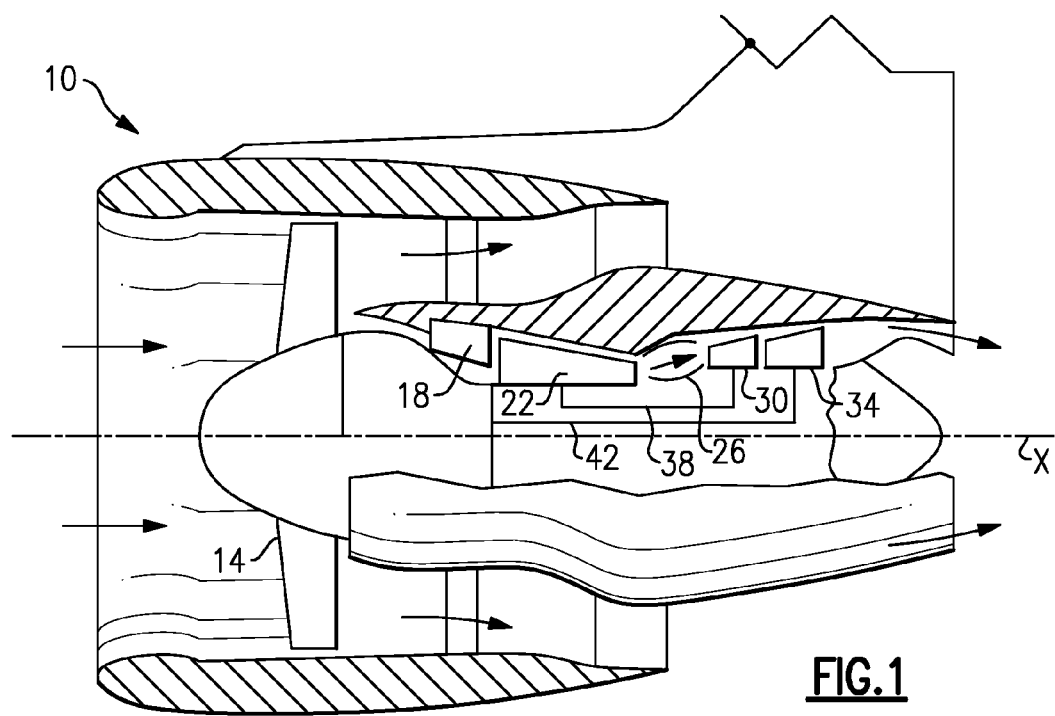
FIG. 1 schematically shows an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. The gas turbine engine is circumferentially disposed about an engine centerline X. During operation, the fan section 14 intakes air, the compressors 18, 22 pressurize the air. The combustor 26 burns fuel mixed with the pressurized air. The high and low pressure turbines 30, 34 extract energy from the combustion gases flowing from the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. The example method is not limited to the two-spool gas turbine architecture described above and may be used with other architectures such as a single spool axial design, a three spool axial design and other architectures. That is, there are various types of gas turbine engines, many of which could benefit from the examples disclosed herein, which are not limited to the design shown.

Figure 2:
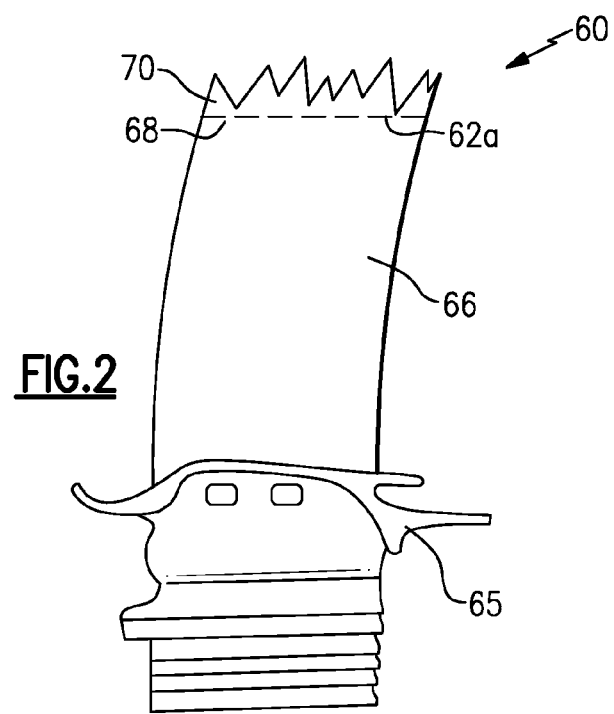
FIG. 2 shows a worn blade of the FIG. 1 gas turbine engine.

Referring now to FIG. 2, a worn turbine blade 60 within the high pressure turbine 30 of FIG. 1 includes an airfoil profile 66 extending from a base 65 toward a tip portion 68, which is generally the portion of the airfoil profile 66 furthest from the base 65. In this example, a dashed line 62a is shown within the tip portion 68 of the airfoil profile. The blade 60 includes a worn area 70 near the tip portion 68. As known, stress from the blade 60 rubbing within the gas turbine engine 10 removes material from the tip portion 68 causing the worn area 70. For example, the blade 60 may rub against a surrounding engine portion such as an outer air seal. Although shown as a turbine blade 60, it should be understood that disclosed examples may be applied to a blade in the compressor 18 or low pressure turbine 34.

Figure 3:
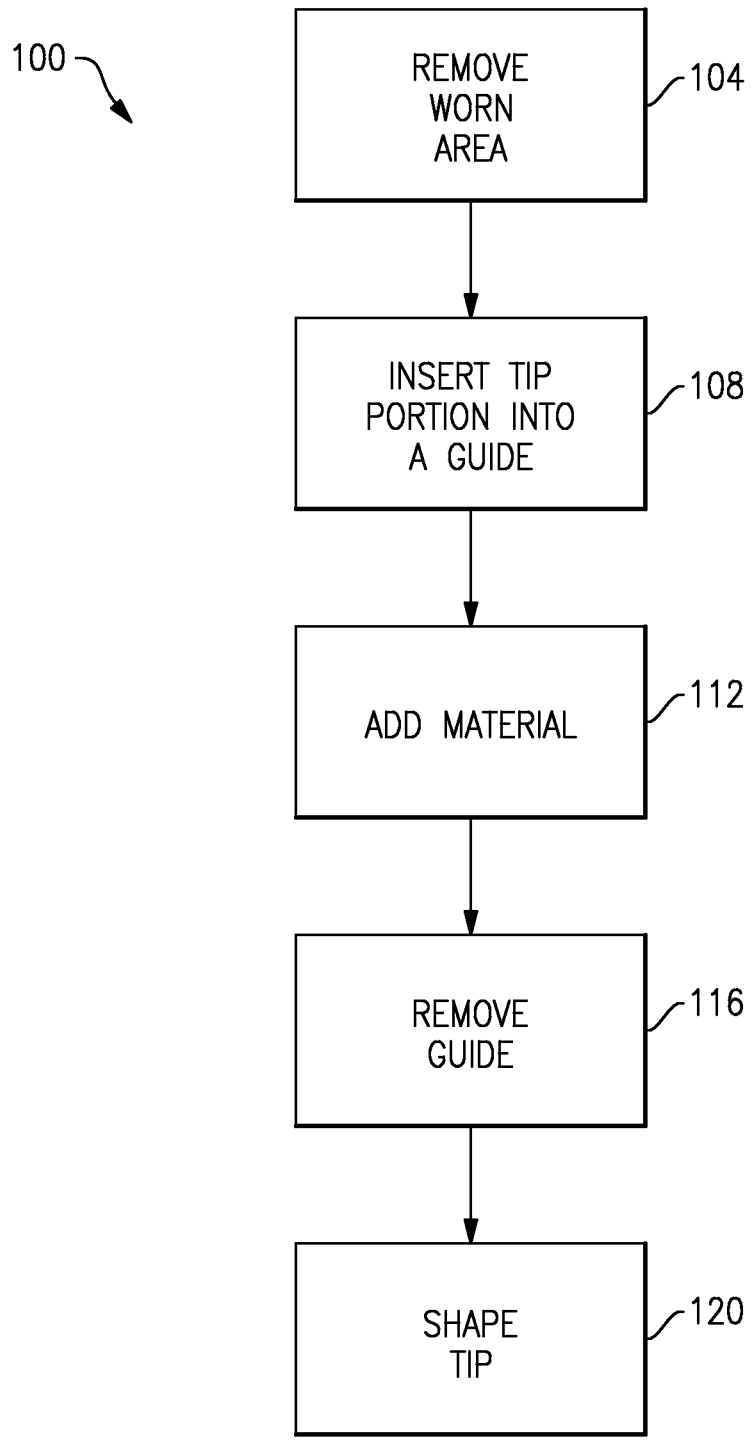
FIG. 3 shows the flow of an example method for repairing the FIG. 2 blade.

As shown in FIG. 3, an example method 100 for repairing the blade 60 of FIG. 2 includes a step 104 of removing the worn area to smooth the blade tip portion 68. In this example, approximately 25 mm of the worn area 70 is removed to smooth a tip end of the blade 60 prior to further repairs. Machine grinders or similar tools may remove the worn area.

After removing the worn area 70, the end of the blade 60 corresponds generally to the blade surface 62, as illustrated by the dashed line 62a in FIG. 2. Other examples may remove more or less material depending on the desired location of the blade surface 62 and how severely the blade 60 is worn. The method 100 next includes inserting the tip portion 68 into a guide at step 108 to secure the blade 60. Material is added to the tip portion at step 112. At step 116 the guide is removed, and at step 120 a different tip is shaped from the material added at step 112. In another example, the step of inserting the tip portion 68 into the guide at step 108 is eliminated. In such an example, additional material is added to the tip portion at step 112 without using the guide.

FIGS. 4-7 are used to describe an example implementation of the method 100. Referring to FIG. 4, an example guide 72a includes an aperture 76a for receiving the tip portion 68 of the blade 60 (FIG. 2). The profile of the aperture 76a aligns with the airfoil profile 66 of the tip portion 68. In this example, two milled guide halves are joined with tack welds 77 to fabricate the aperture 76a within the guide 72a. Slots 78 or seams are created where the halves join. The example guide 72a is a plate, but other guides 72a could be used and fall within the scope of this disclosure.

FIG. 5 shows another example guide 72b without slots 78. An Electrical Discharge Machining (EDM) cutter forms the aperture 76b within the guide 72b, for example. A fixture assembly 80 secures the guide 72b relative to the blade 60 when adding additional material 84 using a welder 88. Other examples include utilizing manual welding processes to add the additional material 84, such as, adding the additional material 84 with a handheld welder for example. Securing the guide 72b and the blade 60 within the fixture 80 represents step 108 of the FIG. 3 method. The worn area 70 of the blade 60 (FIG. 1) is typically removed prior to securing the blade 60 within the fixture 80.

In this example, the additional material 84 is added to the blade surface 62 using a modified Metal Inert Gas (MIG) welding process, such as the cold metal transfer welding process developed by Fronius Inc. As known, cold metal transfer and similar processes facilitate weld droplet formation. Cold metal transfer and similar processes also utilize less heat than other welding processes to facilitate reducing burn through or warp. Both automated and manual cold metal transfer welding processes may be used to add the additional material 84 to the blade surface 62.

In this example, the fixture 80 secures the guide 72b relative to the blade 60 such that the blade surface 62 is substantially flush with a surface 73 of the guide 72b. Together, the blade surface 62 and the surface 73 of the guide 72b provide a relatively flat rectangular area larger than the blade surface 62. Although application of the additional material 84 is desired on the blade surface 62, moving the welder 88 in multiple directions to apply additional material 84 to the blade surface 62 is undesirable in some examples. That is, an operator of the welder 88 may desire to apply the additional material 84 by moving the welder 88 in a single direction rather than multiple directions. Adding the guide 72b to provide the relatively rectangular area facilitates supporting additional material 84 in areas other than the blade surface 62. Thus, the welder 88 may move in a single direction to apply the additional material 84 without the additional material 84 dripping down the blade 60 or otherwise moving away from the blade surface 62.

In other examples, the worn area 70 of the blade 60 is secured within the aperture 76b, but slightly above or recessed from the surface 73 of the guide 72b. Other examples include applying the additional material 84 on the blade surface 62 without using the guide 72b or the fixture 80, such as when manually applying the additional material 84.

Referring again to the example utilizing the guide 72b and the fixture 80, when the blade surface 62 is positioned within the aperture 76b, the guide 72b limits movement of the additional material 84 away from the blade surface 62 toward the base 65 of the blade 60. The additional material 84 instead remains near the blade surface 62, the surface 73 of the guide 72b or both. Without the guide 72b, additional material 84 would spill down the sides of the blade 60 toward the base 65. Thus the guide 72b acts like a platform to hold the additional material, here weld filler, near the blade surface 62, which facilitate concentrated application of the additional material 84 to the blade surface 62.

FIGS. 6 and 6A illustrate the intermediately repaired blade 60 removed from the fixture 80 and having additional material 84 secured to the blade surface 62 and the guide 72a. As shown, particularly in the top view of FIG. 6A, the example welder 88 adds the additional material 84 in a single pass represented by the illustrated directional arrows. Previously, adding additional material 84 to the airfoil profile of the worn area 70 required complex multi-directional control of the welder 88. Using the guide 72b enables the welder 88 to apply more additional material 84 during the single pass without the additional material moving away from the blade surface 62, such as down the sides of the blade 60 toward the base 65. The added additional material 84 forms a repaired section of the blade 60. As known, the width of the additional material 84, here a weld bead, can be controlled by adjusting welding parameters.

After removing the blade 60 and guide 72b from the fixture 80, the guide 72b is separated from the additional material 84 and the blade 60, which may require cutting the guide 72b from the blade 60. After removing the guide 72b from the blade 60, the additional material 84 is shaped to form a different blade tip 90 and repaired blade 60, as shown in FIG. 7. Grinders or similar machining tools are often used to shape the additional material 84 into the desired airfoil profile.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of repairing an airfoil, comprising the steps of:
 (a) moving a welder in a single direction to deposit additional material on a worn airfoil and a guide, wherein the worn airfoil extends radially from a base to a tip, wherein the guide is a plate;
 (b) limiting movement of the additional material during the depositing using, exclusively, a radially-facing surface of the guide and the worn airfoil; and
 (c) altering some of the additional material exclusively to form a desired airfoil contour.

2. The method of claim 1, further comprising inserting the worn airfoil into an aperture within the guide, the aperture having an airfoil shape.

3. The method of claim 2, including using a fixture to secure the guide relative to a tip end portion of the worn airfoil.

4. The method of claim 2, wherein a profile of the aperture is aligned with the desired airfoil contour.

5. The method of claim 1, further comprising removing the guide and the worn airfoil from the fixture after securing additional material, the additional material holding the guide relative to the worn airfoil.

6. The method of claim 1, wherein the securing additional material step includes using a cold metal transfer welding process.

7. The method of claim 1, further comprising removing some of the worn airfoil prior to securing additional material.

8. The method of claim 1, wherein the worn airfoil is a blade.

9. The method of claim 1, wherein the securing additional material step forms a different tip for the worn airfoil.

10. The method of claim 6, wherein the cold metal transfer welding process is a manual cold metal transfer process.

11. A method of repairing a blade for a gas turbine engine, comprising the steps of:
   (a) removing a worn tip area from a blade;
   (b) utilizing cold metal transfer techniques to deposit additional welding material exclusively on the blade and a guide in a single pass to form a different tip area for the blade, wherein the blade extends radially from a base to a tip, wherein the guide is a plate;
   (c) using the blade to support the additional welding material during the deposit; and
   (d) limiting movement of the additional material during the deposit using, exclusively, a radially-facing surface of the guide and the blade.

12. The method of claim 11, further comprising holding the blade in a fixture when depositing the additional material.

13. The method of claim 1, wherein the additional material is not held within a cavity.

14. The method of claim 11, including deposing the additional welding material in a single pass.

15. A method of forming a portion of an airfoil, comprising the steps of:
   (a) depositing additional material on an airfoil and a guide, wherein the airfoil extends radially from a base to a tip, wherein the guide is a plate;
   (b) limiting movement of the additional material during the depositing using, exclusively, the airfoil and a radially-facing surface of the guide; and
   (c) altering some of the additional material to form a desired airfoil contour.

* * * * *